United States Patent [19]

Ackerman

[11] E Re. 30,950

[45] Reissued Jun. 1, 1982

[54] FOLDED TIE LINER

[76] Inventor: Myron H. Ackerman, 2691 S. Course Dr., Bldg. 19, Pompano Beach, Fla. 33060

[21] Appl. No.: 166,539

[22] Filed: Jul. 7, 1980

Related U.S. Patent Documents

Reissue of:

[64] Patent No.: 4,123,802
Issued: Nov. 7, 1978
Appl. No.: 831,368
Filed: Sep. 8, 1977

[51] Int. Cl.[3] ..... A41D 25/16

[52] U.S. Cl. ..... 2/144; 2/150

[58] Field of Search ..... 2/144, 146, 150, 153, 2/157, 243 R

[56] References Cited

U.S. PATENT DOCUMENTS

| | | | |
|---|---|---|---|
| 1,756,901 | 4/1930 | Moore | 2/146 X |
| 1,769,547 | 7/1930 | Robbins | 2/157 |
| 2,304,935 | 12/1942 | Langsdorf | 2/146 |
| 2,400,700 | 5/1946 | McCurrach | 2/146 X |
| 2,774,076 | 12/1956 | Brostoff | 2/146 |
| 2,793,370 | 5/1957 | Stein | 2/243 R |
| 3,426,360 | 2/1969 | Ackerman | 2/146 |
| 3,562,814 | 2/1971 | Ackerman | 2/146 |
| 3,657,743 | 4/1972 | Bucci | 2/146 |

*Primary Examiner*—Louis Rimrodt
*Attorney, Agent, or Firm*—Shlesinger, Fitzsimmons & Shlesinger

[57] ABSTRACT

The liner is produced by folding portions of an elongate piece of fabric into overlapping relation about one or more longitudinally extending fold lines, so that the folded liner, when inserted as a liner in a conventional necktie casing, will lend improved body and feel to the tie during use. The blank from which the liner is produced has a wide end and a narrow end, respectively, and in at least one embodiment includes an integral pocket section which can be attached to one end of the outer casing to provide therefor the conventional facing or tipping.

7 Claims, 7 Drawing Figures

FOLDED TIE LINER

Matter enclosed in heavy brackets [ ] appears in the original patent but forms no part of this reissue specification; matter printed in italics indicates the additions made by reissue.

This invention relates to neckwear, and more particularly to a novel, folded liner for use in the manufacture of men's neckties.

Most men's neckties comprise two basic members, an outer casing and an inner liner. As far as the outer casing is concerned, most four-in-hand ties now being made are produced from woven and/or knitted materials that are cut on a bias, although the cutting on the bias in not necessary. These ties can also be made in one-piece, two-piece, or three-piece configurations. The one-piece construction is in very limited use, and sometimes is used because of the width of the outer material employed. The three-piece construction is perhaps the most important and most widely used variety. The two-piece construction is used, when necessary, but it is rather expensive.

Men's ties usually run from 40 to 60 inches in length, and can either be hand stitched or machine stitched. The hand stitched ties, however, represent a minimal portion of current tie production.

Most such ties have a "tipping" or "facing", which is a piece of material sewn to the back of the tie casing, either on the wide end of the tie or at the narrow end thereof, or at both ends. This is done to give the tie a more luxurious appearance. Any of the three names, tipping, pocket or facing, are used to described this feature.

The liner portion of the tie lends body and feel to the casing, and also adds life to the tie by preventing its casing from being unduly distorted or twisted in use. As pointed out in the U.S. Pat. Nos. 3,426,360 and 3,562,814, it has long been conventional to employ as a tie liner either a single layer of fabric, which is attached to the inside of the tie and extends from one end thereof to the other, or overlapped layers of fabric of either the single or double variety. In the case of either the single or double overlap varieties, the overlapping portions of the lining do not extend across the entire width of the casing except for the central or neckband portion thereof.

Also disclosed in the above-noted patents is a necktie liner comprising two separate and distinct layers of fabric which are similar in configuration, and are placed in a tie casing substantially coextensively of one another.

The materials used for the tie liner usually comprise a woven fabric made from synthetic fibers, or a combination of synthetic and wool fibers, although knitted and non-woven fabric have also been used to some extent in a minor way. The fabric from which the liners are made is usually cut on the bias so that it will be more resilient, or have more self-contained stretch or elongation in its longitudinal direction, than would fabric which was cut straight.

There are several known ways of making the above-noted single layer lining, or the lining having single or double overlap. One of the most economical ways, as far as minimizing cutting wastes is concerned, is to produce the lining in two pieces, one having a rather large or wide end for use adjacent the wide end of the tie, and the other end being narrower and disposed to be placed adjacent the small end of the tie. These two pieces are stitched together to form one long lining, which is then inserted into the tie either with or without an additional 50 inch strip of lining material about $\frac{7}{8}$ of an inch wide and cut on the bias to add additional body to the liner. Still another known method is to use a liner having a large end but no small end, the large end then being secured to the long, narrow ($\frac{7}{8}$ inch) bias cut strip, so that one end of the strip itself serves as the small end of the liner. This would be similar to the above-noted single overlap liner.

The one-piece lining cut in the shape of the tie itself, and on the bias, is a much more satisfactory lining, but it is more costly since it is cut to the shape of the tie and therefore results in much waste fabric which has to be discarded. This one-piece lining can also be used in combination with the narrow ($\frac{7}{8}$ inch) bias cut strip, which can be superposed over the center of the one-piece liner to add strength to it. This could be classified as the above-noted double overlap liner. could be classified as the above-noted double overlap liner.

A liner having two large ends may be employed in a tie, together with the bias cut narrow strip ($\frac{7}{8}$ of an inch wide), thereby giving the front of the tie more "beef" or "hand", but still permitting some economy in the cutting and saving of materials.

Still another method is to make the liner as disclosed in the above-noted U.S. patents wherein two full cut linings, superposed one on the other, and either being of the same or different materials, is placed in the tie to increase, among other factors, the crease resistance of the tie, and also to add quality to the "hand" of the tie. This is the most expensive way of cutting and using a liner, but is used most extensively today.

As much as three separate linings, each superimposed one on the other, have been employed in the case where the outer material is extremely light; this appears to be the most layers that have ever been employed in ties to date.

Obviously, whenever a light outer material is used for a tie, or the tie casing, the tie liner must be heavier; and conversely, when a heavy material is used for the outer casing, a lighter weight lining should be employed.

From the foregoing it will be apparent that the better ties are made with a full, double inner lining or liner, and usually are composed of a synthetic fabric, or a blend of synthetic and wool fibers. Unfortunately such ties are usually expensive and difficult to manufacture due to the importance of keeping the two separate liners in registry, one over the other within the casing. If the two layers of the liner accidentally shift relative to each other during the manufacture of the tie, the resultant tie will lead to off-center linings, which in turn adversely affect the knotting and wear characteristics of the finished tie. Moreover, the double interliners are quite heavy and bulky, and are not particularly satisfactory for use in connection with lightweight wearing apparel, which currently appears to be so popular.

An object of the present invention, therefore, is to provide a novel tie liner which is substantially easier to manufacture and to incorporate in ties, as compared to prior such liners.

Another object of this invention is to provide an improved tie liner of the type which permits selection of the proper inner fabric with the correct number of folds to suit the type of outer material.

Another object is to provide a folded liner which permits the use of sharply less expensive knitted or non-woven fabrics.

Still a further object of this invention is to provide an improved tie liner of the type described, which can be made of any fabric, which is woven, non-woven or knitted, and is either cut straight or on the bias.

A further object of this invention is to provide a novel tie liner which, because of its construction, can be made from relatively light fabrics, but which will nevertheless have a quality equivalent to that of liners made of heavier material.

More specifically, it is an object of this invention to provide a tie liner which is manufactured by folding an elongate piece of fabric into a multiplicity of folds, which, when the fabric is incorporated in the tie as the liner, will provide unexpectedly improved appearance and wear of the tie.

A further object of this invention is to provide a novel blank for producing a necktie liner of the type having integral pocket-forming sections from which the small or large or both pockets of a tie may be formed.

Other objects of the invention will be apparent hereinafter from the specification and from the recital of the appended claims, particularly when read in conjunction with the accompanying drawings.

Figure 1:
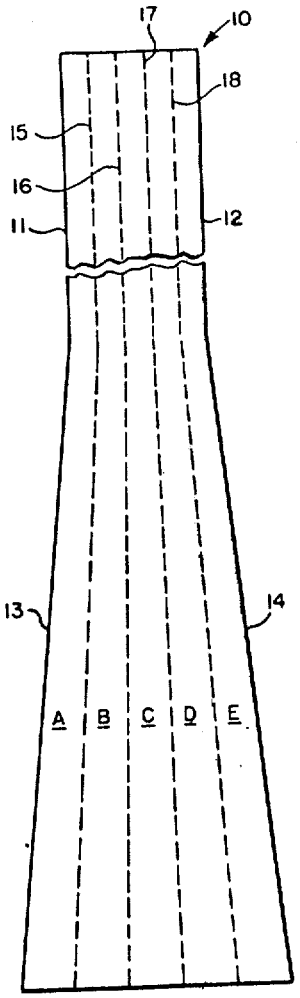
FIG. 1 is a fragmentary plan view of a fabric blank which is adapted to be folded to form a necktie liner made according to one embodiment of this invention.

Referring now to the drawings by numerals of reference, and first to FIGS. 1 to 4, 10 denotes generally an elongate, fabric blank which has the overall, general configuration of a necktie, at least to the extent that the blank may be from 40 to 60 inches in length, and has narrow and wide ends, respectively. As illustrated in FIG. 1, the upper, narrow end of blank 10 has spaced, parallel side edges 11 and 12, which may extend for approximately half of the length of the blank, and its lower end had downwardly diverging edges 13 and 14.

Figure 2:
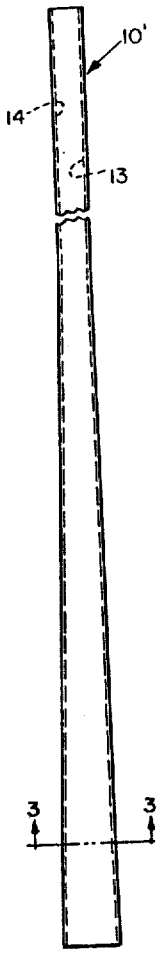
FIG. 2 is a fragmentary plan view of a liner produced by folding the blank shown in FIG. 1.
Figure 3:
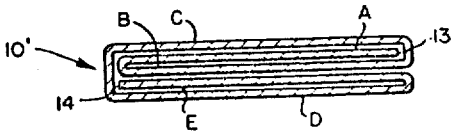
FIG. 3 is an enlarged sectional view taken along the line 3—3 in FIG. 2 looking in the direction of the arrows, and with the thicknesses of the folded fabric being exaggerated for purposes of illustration.
Figure 5:
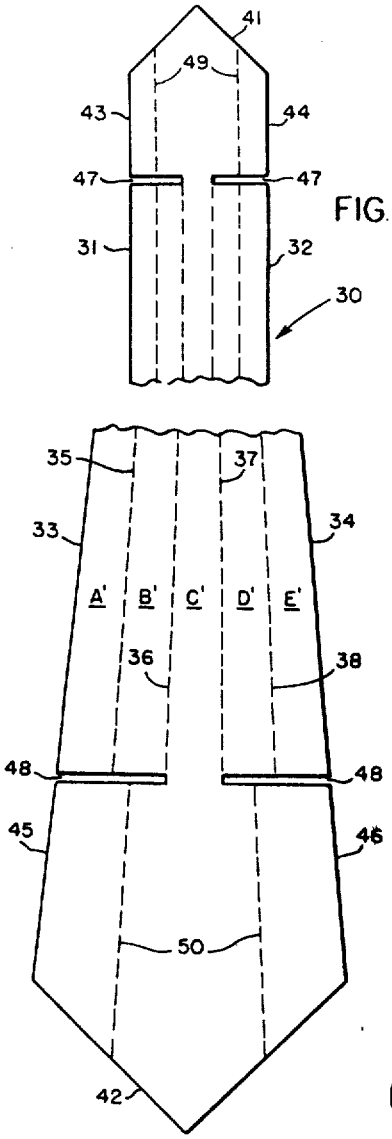
FIG. 5 is a fragmentary plan view of a modified fabric blank for producing a liner made according to another embodiment of this invention.

To enable the blank 10 to be used as a necktie liner, it is adapted to be folded several times about a plurality of longitudinally extending, equi-spaced fold lines denoted by broken lines in FIG. 1 at 15, 16, 17 and 18, respectively. These lines divide the blank into five generally equal, longitudinally extending sections A, B, C, D and E. One way of folding the blank into its finished form 10' is illustrated in FIGS. 2 and 3, wherein, when completely folded, the liner has its five sections superposed one over the other, as shown in FIG. 3.

Figure 4:
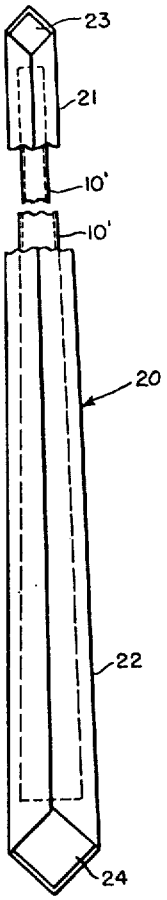
FIG. 4 is a fragmentary plan view looking at the back of a necktie incorporating this liner.

After being folded and, if desired, pressed to help retain its folded form, the liner 10' can be inserted into a conventional tie casing denoted generally at 20 in FIG. 4. The casing or outer fabric 20 has the usual narrow and large ends 21 and 22; and in the illustrated embodiment separate pockets of finishing material 23 and 24 are sewn over the inside surfaces of the small and large ends, respectively of the casing in the usual manner. In this particular tie, the liner 10' is located centrally within the casing 20, where it may be stitched against movement relative to the casing 20; or alternatively, it can be merely laid within the casing 20 to function as a folded liner.

Moreover, although in FIG. 4 the liner 10' appears somewhat narrow than the outer casing 20, it will be understood that this is merely for purposes of illustration, and that in practice the liner is intended to fill out the casing. For example by this multi-folding the outer casing can be fully interlined, and "emptiness" at the edges can be eliminated by heavier pressing to "widen" the interlining.

While in the first embodiment the liner 10' has been produced by folding the blank 10 into five different layers, it will be apparent that, depending upon the desired hand, and also upon the particular fabric which is used for the outer casing 20, it will be possible also to manufacture the liner by folding a blank, such as that denoted at 10, into two, three or four folds, rather than into five separate layers. For the currently popular lighter outer tie casings, however, a liner having five superposed sections (four fold lines) is particularly suitable.

Referring now to the embodiment illustrated in FIGS. 5 to 7, 30 denotes generally a modified liner blank comprising a piece of fabric having a narrow end with generally parallel side edges 31 and 32, and a wide end having downwardly (FIG. 5) diverging side edges 33 and 34. As in the first embodiment, blank 30 has four, generally equally-spaced, longitudinally extending fold lines 35, 36, 37 and 38, about which the sections A', B', C', D' and E' are adapted to be folded in overlapping relation.

Blank 30 differs from blank 10 in that it includes at opposite ends thereof small and large pocket-forming sections 41 and 42, respectively, which are integral at their inner ends with opposite ends of the central portion C' of the blank 30. The section 41 conforms, generally, to the configuration of the small end of the outer casing of a conventional tie, while section 42 conforms, generally, in configuration to the large end of the outer casing of a tie. Section 41 has spaced, parallel side edges 43 and 44 which register with the edges 31 and 32, respectively, of the liner 30; and section 42 has inclined side edges 45 and 46 which register with the edges 33 and 34, respectively on the larger end of the blank. Section 41 is separated from portions A', B' and from section D' and E' of the blank by a pair of registering slits or cuts 47, which extend inwardly from opposite sides of the blank 30 to the central section C. Likewise section 42 is separated from sections A', B' and sections D', E' by registering cuts 48 which extend inwardly from opposite sides of blank 30 to its central section C'. As noted hereinafter, marginal side portions of the blank section 41 are foldable about a pair of spaced fold lines 49 formed in section 42 are likewise foldable about a pair of spaced fold lines 50, which are formed in section 42 adjacent opposite sides thereof.

Figure 6:
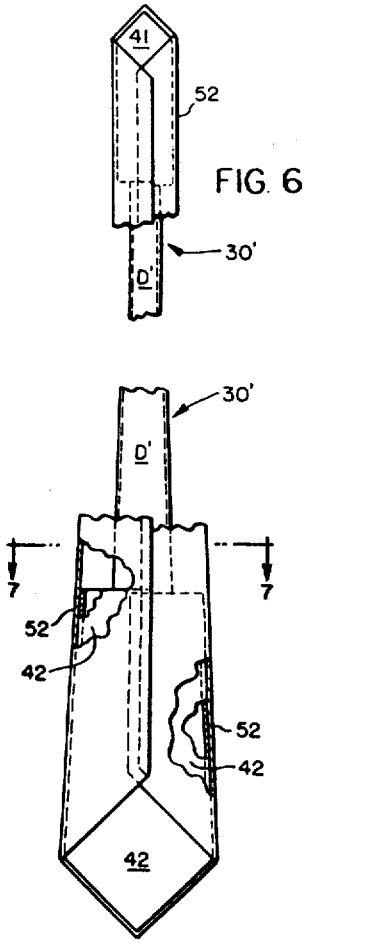
FIG. 6 is a fragmentary plan view looking at the back of a necktie incorporating a modified tie liner made by folding the blank shown in FIG. 5.
Figure 7:
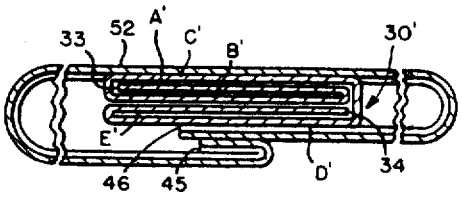
FIG. 7 is an enlarged, fragmentary sectional view taken along the line 7—7 in FIG. 6 looking in the direction of the arrows.

The liner blank 30 is adapted to be employed in conjunction with an outer tie casing 52 (FIGS. 6 and 7), which has approximately the same length as the blank 30, and which has small and large ends, respectively, which register with the large and small pocket sections 42 and 41, respectively of the blank. Before the tie is folded into its final configuration the pocket sections 41 and 42 are stitched along their marginal edges to the registering edges of the outer casing 52, and the remaining portion of the blank 30 is folded about its fold lines 35, 36, 37 and 38 into the final liner configuration as denoted at 30', wherein sections A', B', C', D' and E' thereof are disposed in essentially superposed registering relation as shown in FIG. 7. Thereafter the marginal edges of the outer tie casing 52 are folded rearwardly into overlapping relation as shown in FIGS. 6 and 7, where they are stitched one to the other in known manner, to complete the tie. During this folding operation the pocket sections 41 and 42 of the blank, which are now sewn to the corresponding ends of the outer casing 52, are folded about their respective fold line 49 and 50, so that in the finished tie, sections 41 and 42 form the small and large pockets, respectively, and the remaining section of the blank extends between the pockets 41 and 42 to produce a liner which affords the desired hand, body, etc. for the tie.

From the foregoing it will be apparent that applicant's invention provides relatively simple and inexpensive means for forming an improved tie liner. Because applicant's novel liner minimizes cutting and fabric scraps, the liner is substantially more economical than prior such liners. Moreover, as noted above, the liner itself may be made of prefolded material, and can be merely laid within the outer tie casing without stitching (free-floating), or it may be stitched, fused, adhered by adhesive, or otherwise secured against movement within the outer casing, as desired. Moreover, the liner may be employed in a tie in its simple form as illustrated in the first embodiment, wherein it is not provided with any integral pocket sections, or alternatively, it can be made with either or both of the small and large pocket sections, respectively, which project from opposite ends of the central section C'. Unlike some existing liners, applicant's folded liner resists cupping, curling and twisting. Moreover, by folding the liner as shown in FIGS. 3 and 7 its edges are protected against unravelling by being folded inwardly within the outer folds.

One of the obvious advantages of a linear of the type described is that it can be made from relatively light fabric, as compared to prior liners, since the liner blank need only be folded one or more times to impart to it, when used as a liner, the same desirable properties which currently can be achieved in a tie only through the use of a heavy material as a liner. The resultant product produces a tie, which, when hanging on a retail rack, has greater eye appeal and does not look as stiff or hard or firm as present-day ties. Since each of the several superposed sections of the folded liner has one edge movable relative to the adjacent sections, the novel liner makes it easier to manipulate a necktie without unduly displacing adjacent sections relative to each other during the tying and untying thereof, and moreover, considerably increases the comfort of the tie, when in use. Moreover, the liner imparts to the associated tie casing a much greater wrinkle recovery feature, because cushions of air caused by the material being folded over itself, tend to resist the formation of wrinkles in the outer casing of the tie and eliminates flat edges.

While this invention has been described and illustrated in detail in connection with only certain embodiments thereof, it will be apparent that it is capable of further modification. For example, the blank 10 of FIG. 1 or 30 of FIG. 5 obviously could be produced from two or more pieces of fabric sewn together to produce the desired blank configuration. Moreover, it will be apparent also that this application is intended to cover any such modifications, or any others that may fall within the scope of one skilled in the art or the appended claims.

Having thus described my invention, what I claim is:

1. A four-in-hand necktie, comprising an elongate fabric casing having therethrough an elongate central opening, and adapted to be tied intermediate its ends into a knot, when the necktie is in use, and a [pre-folded, like-weight] *folded, light-weight* fabric liner positioned in the central opening in said casing to improve the body and feel of the necktie, said liner comprising an elongate piece of fabric folded about a plurality of longitudinally extending fold lines to position at least three longitudinally extending portions of the liner in superposed, substantially registering relation in said casing, said superposed portions of said liner extending continuously through said casing from at least a point adjacent one end of said opening in the casing at least to a point adjacent the opposite end of said opening, whereby said superposed portions extend beyond opposite sides, respectively, of the knot formed in said casing, when the necktie is in use, and each of said superposed portions of the folded liner having at least two longitudinal edges thereof movable relative to the adjacent superposed portions of the liner.

2. A necktie as defined in claim 1, wherein said fold lines are substantially equi-spaced from each other and from the longitudinal side edges of the piece of fabric which is folded to form the liner.

3. A necktie as defined in claim 2, wherein each of said superposed portions of said liner are substantially similar in configuration, whereby said liner is of substantially uniform thickness.

4. A necktie as defined in claim 2, wherein said liner had therein four longitudinally extending fold lines, and five longitudinally extending portions of said liner are disposed in substantially superposed, registering relation.

5. A necktie as defined in claim 1, wherein said liner is substantially equal in length to said casing, portions of said casing project beyond opposite ends, respectively, of said central opening, and integral, pocket-forming sections of said liner project beyond opposite ends, respectively, of said superposed portions of the liner, and register with, and are secured to, said projecting portions of said casing.

6. A necktie as defined in claim 1, wherein said casing comprises an elongate piece of fabric having opposed, pointed ends, and having marginal, longitudinally extending portions thereof folded into overlapping relation to form the central opening in said casing, said liner has on at least one end thereof a pocket-forming section integral with at least one of said superposed portions of the liner, and extending beyond said superposed portions into registry with one of the pointed ends of said casing fabric, and said pocket-forming section is similar in configuration to, and is secured around its marginal edges to, said one pointed end of said casing.

7. A necktie as defined in claim 6, wherein an integral pocket-forming section projects beyond the superposed portions of said liner at each end thereof, and said pocket-forming sections register with and are secured to said pointed ends of said casing fabric.

* * * * *